United States Patent Office 3,389,169
Patented June 18, 1968

3,389,169
Δ³-A-NORANDROSTENE-2β,17β-DIOLS AND ESTER DERIVATIVES
Seymour D. Levine, Princeton, N.J., and Patrick A. Diassi, Westfield, N.J., assignors, by mesne assignments, to E. R. Squibb & Sons, Inc., New York, N.Y., a corporation of Delaware
No Drawing. Filed July 26, 1965, Ser. No. 474,983
6 Claims. (Cl. 260—488)

ABSTRACT OF THE DISCLOSURE

This disclosure relates to Δ³-A-norandrostene-2β,17β-diol, derivatives and intermediates thereof. The compounds of this invention are useful as intermediates and can be utilized as anabolic in lieu of such steroids as 17α-ethyl-19-nortestosterone.

This invention relates to and has as its object the provision of new physiologically active steroids, processes for their preparation and novel intermediates useful in said preparation.

More particularly, this invention relates to the production of compounds of the formula

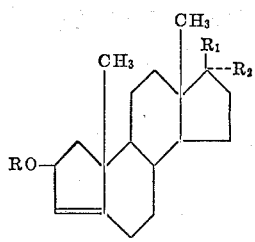

wherein R is selected from the group consisting of hydrogen and acyl, R¹ is selected from the group consisting of hydroxy and acyloxy, and R₂ is selected from the group consisting of hydrogen and methyl.

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkanoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The compounds of this invention, in addition to being useful as intermediates in further chemical synthesis of steroids, have also been found to possess certain physiological activity. These compounds have been found to possess increased anabolic activity and may be employed in place of such steroids as 17α-ethyl-19-nortestosterone in therapy. The compounds of this invention may be administered parenterally, the dosage and/or concentration adjusted for the relative potency of the particular compound employed.

The compounds of this invention may be prepared by the processes of this invention beginning with A-nortestosterone as starting material.

This starting material is reduced by metal hydride reduction. This reaction is carried out at temperatures from 0° to 65° centigrade. Sodium borohydride is the preferred metal hydride that may be utilized in the reduction of the starting material to yield Δ³-A-norandrostene-2β,17β-diol.

Alternatively, when 17α-methyl-A-nortestosterone is reduced with a metal hydride, e.g., lithium aluminum hydride under reflux conditions, 17α-alkyl-Δ³-A-norandrostene-2β,17β-diol will be formed.

Further, utilizing Δ³-A-norandrostene-2β,17β-diol as the starting material and acylating this material by reacting it with an acid anhydride and an organic base, e.g., pyridine, at room temperature yields the 2β,17β-diacyloxy derivative of the starting material. The diacyloxy derivative of 17α-methyl-Δ³-A-norandrostene-2β,17β-diol may be prepared by acylating the parent compound with an acid anhydride (e.g., acetic anhydride) in the presence of perchloric acid to yield the 2β,17β-diacyloxy derivative of the starting material. A 2β-acyloxy derivative of 17α-methyl-Δ³-A-norandrostene-2β,17β-diol may be prepared by acylating the parent material with an acid anhydride and an organic base such as pyridine at room temperature.

The invention may be further illustrated by the following examples. All temperatures are in degrees centigrade unless otherwise stated:

Example 1.—Δ³-A-norandrostene-2β,17β-diol

A mixture of 1 g. of A-nortestosterone in 70 ml. of methanol is treated with 660 mg. of sodium borohydride at 0°. The reaction mixture is stirred at room temperature for four hours, treated with 1 ml. of acetic acid, and evaporated to dryness. The residue is treated with water and extracted with chloroform. The chloroform extracts are washed with a saturated sodium bicarbonate solution, 8% salt solutiton, dried over sodium sulfate and evaporated to dryness. Crystallization of the residue from benzene gives 599 mg. of Δ³-A-norandrostene-2β,17β-diol, M.P. 177–179°. Recrystallization from benzene gives the analytical sample M.P. 183–185°;

$[\alpha]_D^{21} +99°$ (EtOH); $\lambda^{KBr}$ 3.05 and 6.03μ; $\tau_{CDCl_3}^{TMS}$ 9.23 (s, 18-Me), 9.00 (s, 19-Me), 6.37 (m, 17-H), 5.13 (m, 2α-H), and 4.77 (m, 3-H)

Analysis.—Calc'd for $C_{18}H_{28}O_2$ (276.40): C, 78.21; H, 10.21. Found: C, 78.30; H, 10.19.

Example 2.—17α-methyl-Δ³-A-norandrostene-2β,17β-diol

A mixture of 300 mg. of 17α-methyl-A-nortestosterone and 200 mg. of lithium aluminum hydride in 100 ml. of ether is refluxed for one day. The reaction mixture is treated with water and dilute hydrochloric acid. The ether layer is separated and the aqueous phase extracted with chloroform. The organic fractions are washed with 8% salt solution, dried over sodium sulfate and evaporated to dryness. Crystallization of the residue from ethyl acetate gives 104 mg. of 17α-methyl-Δ³-A-norandrostene-2β,17β-diol, M.P. 167–170°. Recrystallization of the residue from ethyl acetate gives the analytical sample, M.P. 177.5–178.5°;

$\lambda^{KBr}$ 3.08 and 6.03μ; $\tau^{TMS}_{CDCl_3}$ 9.12 (s, 18-Me), 8.99 (s, 19-Me), 8.79 (s, 17α-Me), 5.12 (m, 2α-H) and 4.77 (m, 3-H)

*Analysis.*—Calc'd for $C_{19}H_{30}O_2$ (290.43): C, 78.57; H, 10.41. Found: C, 78.55; H, 10.47.

Example 3.—Δ³-A-norandrostene-2β,17β-diol diacetate

A mixture of 150 mg. of Δ³-A-norandrostene-2β,17β-diol in 2 ml. of acetic anhydride and 4 ml. of pyridine is left at room temperature for sixteen hours. The reaction mixture is poured into water, and extracted with chloroform. The chloroform extracts are washed with 8% salt solution, dried over sodium sulfate, and evaporated to dryness to give Δ³-A-norandrostene-2β,17β-diol diacetate.

Example 4.—17α-methyl-Δ³-A-norandrostene-2β,17β-diol 2-acetate

Following the procedure in Example 3 but substituting 17α-methyl-Δ³-A-norandrostene - 2β,17β - diol for Δ³-A-norandrostene-2β,17β-diol there is obtained 17α-methyl-Δ³-A-norandrostene-2β,17β-diol 2-acetate.

Example 5.—17α-methyl-Δ³-A-norandrostene-2β,17β-diol 2,17-diacetate

A solution of 0.0033 ml. of perchloric acid in 0.3 ml. of acetic anhydride is added to 500 mg. of 17α-methyl-Δ³-A-norandrostene-2β,17β-diol or 17α - methyl - Δ³ - A-norandrostene-2β,17β-diol 2-acetate in 10 ml. of acetic anhydride. The reaction mixture is stirred at room temperature for 0.5 hours and then poured into ice water and extracted with chloroform. The chloroform extracts are washed with a saturated sodium bicarbonate solution 8% salt solution, dried over sodium sulfate and evaporated to dryness to give 17α-methyl-Δ³-A-norandrostene-2β,17β-diol diacetate.

What is claimed is:
1. A steroid having the formula

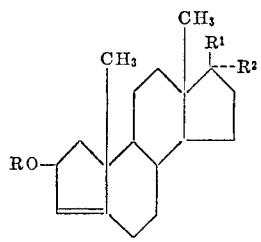

wherein R is selected from the group consisting of hydrogen and acyl, wherein the acyl is derived from a hydrocarbon carboxylic acid of less than twelve carbon, $R^1$ is selected from the group consisting of hydroxy and acyloxy, wherein the acyl is derived from a hydrocarbon carboxylic acid of less than twelve carbons, and $R^2$ is selected from the group consisting of hydrogen and methyl.

2. Δ³-A-norandrostene-2β,17β-diol.
3. 17α-methyl-Δ³-A-norandrostene-2β,17β-diol.
4. Δ³-A-norandrostene-2β,17β-diol diacetate.
5. 17α-methyl-Δ³-A-norandrostene-2β,17β - diol 2-acetate.
6. 17α-methyl-Δ³-A-norandrostene-2β,17β-diol 2,17-diacetate.

References Cited

Chemical Abstracts I, 53: 2293d (1959).
Chemical Abstracts II, 55: 8597 (1961).
Chemical Abstracts III, 54: 9994e–h (1960).
Chemical Abstracts IV, 52: 1195d (1958).

LORRAINE A. WEINBERGER, *Primary Examiner.*

V. GARNER, *Assistant Examiner.*